US012569085B2

(12) United States Patent  (10) Patent No.: US 12,569,085 B2
Fowler et al.  (45) Date of Patent: Mar. 10, 2026

(54) DENSITY-BASED COFFEE ROAST LEVEL CHARACTERIZATION AND/OR DYNAMIC COFFEE GRINDER CONTROL

(71) Applicant: Midea Group Co., Ltd., Beijiao (CN)

(72) Inventors: Simon Fowler, Louisville, KY (US); Leopold Ibel, Louisville, KY (US); Hieu M. Vu, Louisville, KY (US); Dylan Rowe, Buffalo, KY (US); Mingjun Huang, Louisville, KY (US)

(73) Assignee: MIDEA GROUP CO., LTD., Beijiao (CN)

( * ) Notice: Subject to any disclaimer, the term of this patent is extended or adjusted under 35 U.S.C. 154(b) by 737 days.

(21) Appl. No.: 18/062,655

(22) Filed: Dec. 7, 2022

(65) Prior Publication Data

US 2024/0188750 A1    Jun. 13, 2024

(51) Int. Cl.
| | |
|---|---|
| *A47J 31/42* | (2006.01) |
| *A47J 31/52* | (2006.01) |
| *A47J 42/46* | (2006.01) |
| *A47J 42/50* | (2006.01) |
| *G01G 19/40* | (2006.01) |
| *G01N 9/04* | (2006.01) |
| *G01N 9/36* | (2006.01) |

(52) U.S. Cl.
CPC .............. *A47J 31/42* (2013.01); *A47J 31/525* (2018.08); *A47J 42/46* (2013.01); *A47J 42/50* (2013.01); *G01G 19/40* (2013.01); *G01N 9/04* (2013.01); *G01N 9/36* (2013.01)

(58) Field of Classification Search
CPC .. G01G 19/40; G01N 9/04; G01N 9/36; A47J 31/42; A47J 31/525; A47J 42/46; A47J 42/50; A47J 31/52; A23F 5/08; A23F 5/04; A23N 12/00

USPC ......................................................... 73/32 R
See application file for complete search history.

(56) References Cited

U.S. PATENT DOCUMENTS

| | | | |
|---|---|---|---|
| 3,544,331 | A | 12/1970 | Hari |
| 3,780,197 | A | 12/1973 | Stefanucci et al. |

(Continued)

FOREIGN PATENT DOCUMENTS

| | | |
|---|---|---|
| CN | 105147108 A | 12/2015 |
| WO | 2020212145 A1 | 10/2020 |
| WO | 2021191910 A1 | 9/2021 |

OTHER PUBLICATIONS

Czech, et al.; Smart Online Coffee Roasting Process Control: Modelling Coffee Roast Degree and Brew Antioxidant Capacity for Real-Time prediction by Resonance-Enhanced Multi-Photon Ionization Mass Spectrometric (REMPI-TOFMS) Monitoring of Roast Gases; Foods, www.ncbi.nlm.nih.gov/pmc/artoc;es/PMC7278678; 31 pages dated May 14, 2020.

*Primary Examiner* — John E Breene
*Assistant Examiner* — Truong D Phan
(74) *Attorney, Agent, or Firm* — Gray Ice Higdon

(57) ABSTRACT

A roast level of coffee grounds used in a coffee brewing operation may be characterized based at least in part on one or more weights of the coffee grounds determined during a grinding operation, and in some instances, may be used to determine one or more brewing parameters used in the coffee brewing operation. In addition, in some instances the roast level of the coffee grounds may be determined during a grinding operation and used to control the amount of coffee grounds generated during the grinding operation.

20 Claims, 5 Drawing Sheets

(56) References Cited

U.S. PATENT DOCUMENTS

| | | | |
|---|---|---|---|
| 9,804,081 B2 | 10/2017 | Wang et al. | |
| 9,936,835 B2 | 4/2018 | Alshammary | |
| 10,531,675 B2 | 1/2020 | Tan | |
| 2014/0242239 A1* | 8/2014 | Boggavarapu ...... | A47J 31/4492 |
| | | | 426/433 |
| 2017/0318854 A1* | 11/2017 | Tan ......................... | A47J 31/42 |
| 2021/0093120 A1 | 4/2021 | Palmar et al. | |

* cited by examiner

DENSITY-BASED COFFEE ROAST LEVEL CHARACTERIZATION AND/OR DYNAMIC COFFEE GRINDER CONTROL

BACKGROUND

Coffee is a beverage made from roasted coffee beans, and has long been one of the most popular drinks in the world. Numerous devices and processes for making coffee have been developed, with most incorporating some variation on bringing water into contact with ground coffee beans to extract water soluble components from the ground coffee beans that give coffee its distinctive taste. However, roasted coffee beans can have numerous soluble components that impart different types of flavors that can be pleasing or displeasing to different palates, so variations in brewing processes can significantly impact the flavor of the resulting coffee.

Two primary types of coffee brewing devices in common use today are generally referred to as espresso machines and drip coffee makers. Espresso machines force hot pressurized water relatively quickly through packed and finely ground coffee beans to generate a highly concentrated, but low volume type of coffee generally referred to as espresso. Drip coffee makers, on the other hand, rely primarily on gravity rather than pressure, and drip heated water onto a brew basket of more coarsely ground coffee beans to allow the water to seep through the coffee grounds to extract the flavor-producing components therefrom. Drip coffee makers also generally incorporate a disposable or reusable filter in the brew basket such that the coffee grounds are retained in the brew basket while the coffee is fed by gravity into a cup or larger container disposed below the brew basket.

Particularly with drip coffee makers, a number of factors can greatly impact a coffee flavor profile, including, for example, the amounts of ground coffee and water that are used, the grind size used to grind the coffee beans, the temperature of the water, and the amount of time the water contacts the ground coffee, among others. Furthermore, various characteristics of the coffee beans themselves can impact a coffee flavor profile, including variety and roast level. Roast level, for example, refers to the degree that the coffee beans are roasted during production. Coffee beans are often characterized as being "dark," "medium," or "light" roasted (and in some instances, additional categories such as "medium-light" and/or "medium-dark"), and it has been found that the extraction rates of coffee can vary considerably based upon roast level, as dark roasted beans are generally easier to extract because the cell walls of the beans are further broken down and more porous that those of lighter roasted beans.

Coffee producers often characterize the roast levels of their coffee beans and provide such indications on the packaging of the coffee beans. Doing so enables consumers to choose coffees that match their individual taste preferences, as darker roasts tend toward more roasted, smokey and chocolate flavors while lighter roasts tend toward more fruity and floral flavors, assuming the same brewing parameters. Such self-identified roast levels, however, can be imprecise, and furthermore, due to the different extraction rates associated with different roast levels, one given set of brewing parameters that is optimal for one type of roast level may not be optimal for other types of roast levels. As such, a need continues to exist in the art for a manner of precisely assessing and characterizing coffee roast level.

SUMMARY

The herein-described embodiments address these and other problems associated with the art by characterizing a roast level of coffee grounds used in a coffee brewing operation based at least in part on one or more weights of the coffee grounds determined during grinding. In some instances, the characterized coffee roast level may also be used to determine one or more brewing parameters used in the coffee brewing operation, and in some instances a coffee roast level may be determined during a grinding operation and used to control the amount of coffee grounds generated during the grinding operation.

Therefore, consistent with one aspect of the invention, an apparatus may include a coffee grinding mechanism configured to grind coffee beans to generate ground coffee, a weight sensor configured to sense a weight of coffee grounds generated by the coffee grinding mechanism during a grinding operation, and a controller configured to characterize a roast level of the coffee grounds generated by the coffee grinding mechanism based at least in part on the weight of the coffee grounds sensed by the weight sensor.

In some embodiments, the controller is configured to characterize the roast level of the coffee grounds generated by the coffee grinding mechanism based at least in part on the weight of the coffee grounds sensed by the weight sensor by determining a density of the coffee grounds generated by the coffee grinding mechanism. Also, in some embodiments, the controller is configured to characterize the roast level of the coffee grounds generated by the coffee grinding mechanism based at least in part on the weight of the coffee grounds sensed by the weight sensor by determining a rate of weight change of the coffee grounds generated by the coffee grinding mechanism.

Further, in some embodiments, the controller is configured to determine the rate of weight change by determining a first weight of the coffee grounds at a first time during the grinding operation. In some embodiments, the controller is configured to determine the rate of weight change further by determining a second weight of the coffee grounds at a second time during the grinding operation and determining a ratio of a difference between the first and second weights and a difference between the first and second times. In addition, in some embodiments, the controller is further configured to characterize the roast level of the coffee grounds generated by the coffee grinding mechanism based at least in part on a grind size used for the grinding operation.

In some embodiments, the apparatus is a coffee grinder and the controller is a grinder controller, and the grinder controller is configured to communicate data associated with the roast level of the coffee grounds to a coffee maker controller for use in controlling one or more brewing parameters of a coffee brewing operation performed by the coffee maker controller. In addition, in some embodiments, the data associated with the roast level of the coffee grounds includes a rate of weight change, a density or a coffee roast level. Moreover, in some embodiments, the apparatus is a coffee maker controller.

In some embodiments, the controller is further configured to initiate a grinding operation by the coffee grinding mechanism to grind coffee grounds, during the grinding operation, characterize the coffee roast level of the coffee grounds generated by the coffee grinding mechanism, prior to completing the grinding operation, determine an amount of coffee grounds to be ground by the coffee grinding mechanism during the grinding operation based at least in part on the characterized coffee roast level of the coffee grounds generated by the coffee grinding mechanism, and terminate the grinding operation once the determined amount of coffee grounds have been ground by the coffee grinding mechanism. Moreover, in some embodiments, the controller is configured to initiate the grinding operation to grind a predetermined amount of coffee grounds, and to determine the amount of coffee grounds to be ground by adjusting the predetermined amount based at least in part on the characterized coffee roast level.

In some embodiments, the controller is further configured to control one or more brewing parameters during a coffee brewing operation based at least in part on the characterized roast level of the coffee grounds generated by the coffee grinding mechanism. In addition, in some embodiments, the one or more brewing parameters includes a water temperature, a water pressure, a water flow rate, a valve position, a water amount, a coffee amount, a grind size, a brewing ratio, and/or a water/coffee contact time.

Consistent with another aspect of the invention, a coffee maker may include a brew basket configured to house coffee grounds during brewing, a water supply disposed upstream of the brew basket and configured to supply heated water to the brew basket to bring the heated water into contact with the coffee grounds to perform a coffee brewing operation, and a controller coupled to the water supply and configured to control one or more brewing parameters during the coffee brewing operation based at least in part upon a density of the coffee grounds in the brew basket.

In some embodiments, the controller is configured to control the one or more brewing parameters based at least in part upon the density of the coffee grounds by receiving data associated with a roast level of the coffee grounds and controlling the one or more brewing parameters using the received data associated with the roast level of the coffee grounds. Moreover, in some embodiments, the data associated with the roast level of the coffee grounds includes a rate of weight change sensed by a weight sensor during grinding of the coffee grounds or a density.

Consistent with another aspect of the invention, an apparatus may include one or more memories, and one or more controllers configured to execute instructions stored in the one or more memories to control a coffee grinding mechanism to grind coffee beans and generate ground coffee therefrom by initiating a grinding operation by the coffee grinding mechanism to grind coffee grounds, during the grinding operation, characterizing a coffee roast level of the coffee grounds generated by the coffee grinding mechanism, prior to completing the grinding operation, determining an amount of coffee grounds to be ground by the coffee grinding mechanism during the grinding operation based at least in part on the characterized coffee roast level of the coffee grounds generated by the coffee grinding mechanism, and terminating the grinding operation once the determined amount of coffee grounds have been ground by the coffee grinding mechanism.

Also, in some embodiments, the one or more controllers are configured to characterize the coffee roast level by determining a weight of the coffee grounds at one or more times during the grinding operation, and to determine the amount of coffee grounds based at least in part on the weight determined at the one or more times during the grinding operation. In some embodiments, the one or more controllers are configured to characterize the coffee roast level based upon an output of a color sensor positioned to sense the coffee grounds generated by the coffee grinding mechanism during the grinding operation, and to determine the amount of coffee grounds based at least in part on the output of the color sensor during the grinding operation. In addition, in some embodiments, the one or more controllers are configured to determine the amount of coffee grounds by determining a duration of the coffee grinding operation or determining a total weight of coffee grounds to be generated during the grinding operation.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
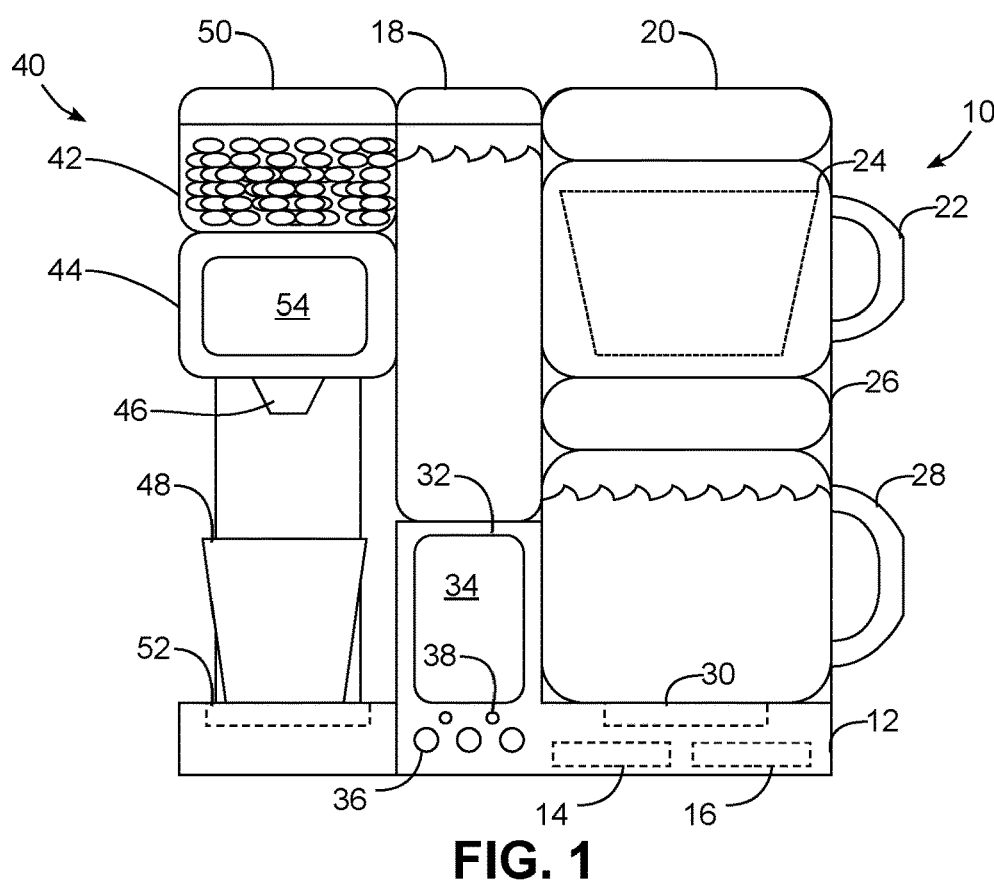
FIG. 1 is a front elevational view of a drip coffee maker consistent with some embodiments of the invention.

Now turning to the drawings, wherein like parts are denoted by like numbers throughout the several views, FIG. 1 illustrates a drip coffee maker 10 consistent with some embodiments of the invention. Drip coffee maker 10 may include a base or housing 12 within which may be included various components utilized in the brewing of coffee, e.g., a heating element 14, and in some instances, a water pump 16, for heating and conveying water from a water reservoir 18 to a water dispenser 20 disposed above a brew basket 22 within which may be disposed a quantity of ground coffee, and in many instances, a disposable or reusable filter. Brew basket 22 in some embodiments may be removable and/or may incorporate a lid or cover providing access to the brew basket 22 when adding ground coffee and a filter prior to brewing and/or when removing the ground coffee and filter after brewing. In some embodiments, a filter support 24 may be used to support a filter, and the coffee grounds contained therein, during a drip coffee brewing operation. Water dispenser 20 in some embodiments may include a shower head or other suitable mechanism for dispensing heated water evenly across the top surface of the ground coffee disposed in brew basket 22 during brewing.

Disposed beneath brew basket 22 is a coffee dispenser 26 that collects the brewed coffee that passes through the filter in brew basket 22 to dispense the brewed coffee into a container via gravity feed, e.g., a carafe 28, which is some instances may be a glass carafe or a thermal carafe, although brewing may be permitted into other types of containers, e.g., mugs or cups. Coffee dispenser 26 may, in some instances, also include an automatic shut-off valve that shuts off dispensing during a brewing operation if the carafe is removed by a consumer. In some instances, a warming element 30 may also be provided in order to maintain a desirable coffee temperature after brewing.

A user interface 32, e.g., including a graphical and/or touchscreen display 34, one or more physical controls 36 (e.g., buttons, knobs, sliders, etc.) and/or one or more indicators 38 (e.g., lights, alphanumeric displays, etc.), may also be disposed on base 12 to enable a user to interact with the drip coffee maker 10.

In some embodiments, a coffee grinder 40 may also be integrated with and/or interfaced with drip coffee maker 10. Coffee grinder 40, for example, may be integrally disposed in base or housing 12 in some embodiments, while in other embodiments, coffee grinder 40 may be removably coupled to or positionable proximate base or housing 12 and interfaced through one or more wires, one or more contacts (e.g., cooperative metal contacts that engage when coffee grinder 40 is attached to or otherwise positioned next to drip coffee maker 10 in the configuration illustrated in FIG. 1), or a wireless network to enable commands and/or data to be communicated therebetween. Coffee grinder 40 may also be powered by drip coffee maker 10 or may be separately powered in various embodiments. In still other embodiments, no coffee grinder may be used, or to the extent a consumer grinds coffee for use with drip coffee maker 10, he or she does so using a completely separate coffee grinder.

Coffee grinder 40 may include a bin or hopper 42 positioned over a burr or blade grinding mechanism 44 that outputs ground coffee from a chute 46 into a container 48. Bin or hopper 42 may also include a lid or cover 50 for allowing for external access to add roasted coffee beans to the bin or hopper. Grinding mechanism 44 may be configured to support variable grind sizes in some embodiments, e.g., through manual or electronically-controlled adjustments to the grinding mechanism. In addition, in some embodiments, a scale 52 may be disposed in coffee grinder 40 to measure the weight of the coffee dispensed through chute 46. User interaction with coffee grinder 40 may be provided through a dedicated interface 54 in some embodiments, while in other embodiments, user interface 32 of drip coffee maker 10 may also control coffee grinder 40.

Figure 2:
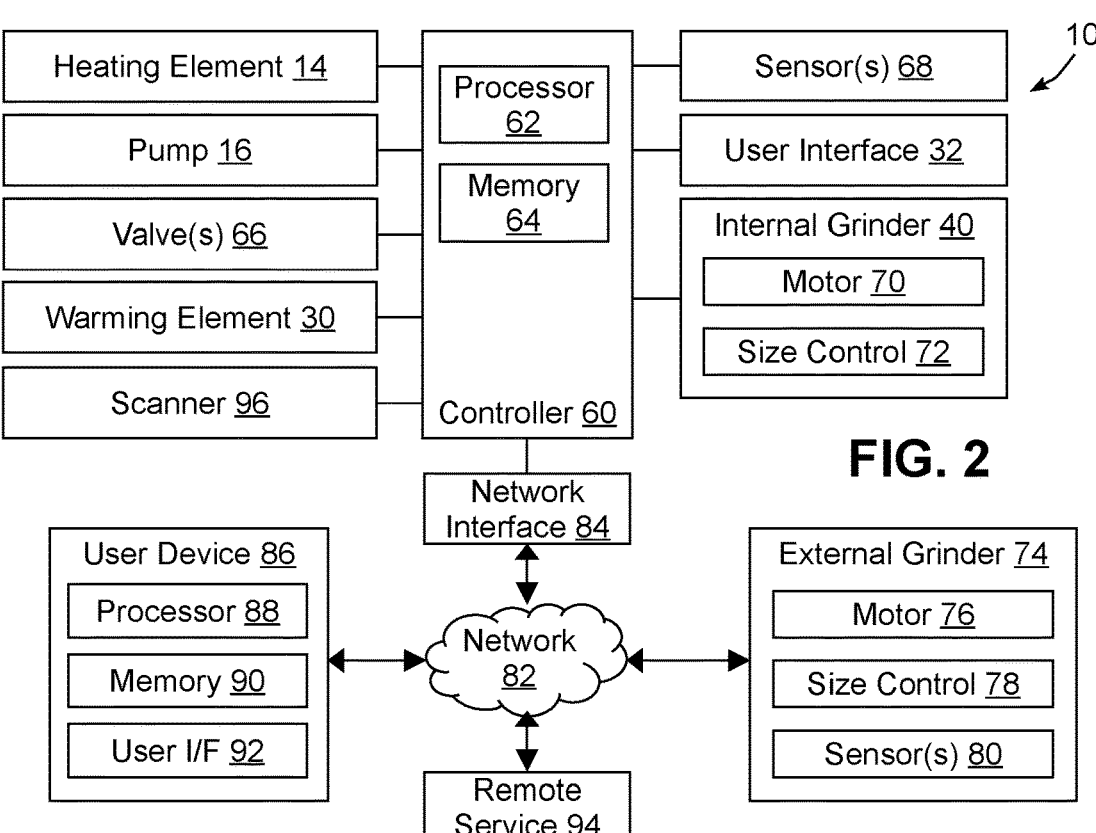
FIG. 2 is a block diagram of an example control system for the drip coffee maker of FIG. 1.

With further reference to FIG. 2, drip coffee maker 10 may be under the control of a controller 60 that receives inputs from a number of components and drives a number of components in response thereto. Controller 60 may, for example, include one or more processors 62 and a memory 64 within which may be stored program code or instructions for execution by the one or more processors 62. The memory may be embedded in controller 60, but may also be considered to include volatile and/or non-volatile memories, cache memories, flash memories, programmable read-only memories, read-only memories, etc., as well as memory storage physically located elsewhere from controller 60, e.g., in a mass storage device or on a remote computer interfaced with controller 60. Controller 60 may also be implemented as a microcontroller in some embodiments, and as such these terms are used interchangeably herein. Controller 60 may also include discrete circuit logic in some embodiments, e.g., including passive and/or active circuit components.

As shown in FIG. 2, controller 60 may be interfaced with various components, including the aforementioned heating element 14, pump 16, warming element 30, user interface 32, and coffee grinder 40, as well as one or more electronically-controlled valves 66 and one or more sensors 68.

In some embodiments, for example, electronically-controlled valves 66 may be disposed upstream and/or downstream of brew basket 22 to effectively control the amount of time that water contacts the ground coffee in the brew basket. An upstream valve 66, for example, may be used to control the flow of heated water into the brew basket 22. A downstream valve 66 may be used to control the flow of coffee out of brew basket 22 into carafe 28 or another container, and in some embodiments, such a valve may also be fully closeable to prevent coffee from dripping from the brew basket whenever carafe 28 is removed. Such a valve may also be used in some instances to control a bloom time. A downstream valve 66 may also, in some embodiments, enable alternate types of brewing processes, e.g., cold brewing processes where unheated water is steeped in coffee grounds for a relatively long duration. While in some embodiments upstream and/or downstream valves 66 may be used, in other embodiments, no electronically-controllable valves may be used and/or one or both of valves 66 may be mechanically controlled. For the purposes of this disclosure, each of pump 16 and valves 66 may be considered to be a flow control device insofar as each may be used in the control of water flow through the brew basket (i.e., either into the brew basket, out of the brew basket, or both).

A wide variety of different types of sensors 68 may also be used, including for example, temperature sensors, fluid pressure sensors, fluid level sensors, flowmeters, presence sensors (e.g., to detect the proper positioning of a carafe, a brew basket, a water reservoir, a grinder hopper, etc.), position sensors, weight sensors, etc. Other sensors that may be suitable in monitoring the status of and otherwise controlling the operation of drip coffee maker 10 will be appreciated by those of ordinary skill having the benefit of the instant disclosure.

As noted above, where coffee grinder 40 is implemented as an internal coffee grinder, controller 60 may be configured to control various components of the coffee grinder directly, e.g., a motor 70 that drives the grinding process (e.g., by rotating one burr cutting element relative to another burr cutting element), and where electronic control of grind size is supported, a size control 72. Size control in other embodiments may be a manual adjustment.

Alternatively, where drip coffee maker 10 is interfaced with an external coffee grinder (e.g., external coffee grinder 74 of FIG. 2, shown including a motor 76, optional size control 78, and one or more sensors 80), controller 60 may communicate with the external coffee grinder over a network 82 through a network interface 84 to instruct the external coffee grinder to grind coffee, e.g., to grind a desired amount (e.g., based on weight or duration) and/or to grind at a specified grind size.

Network interface 84, for example, may represent one or more network interfaces suitable for interfacing with external devices via wired and/or wireless networks such as Ethernet, Bluetooth, NFC, cellular and other suitable networks. It may also be desirable, for example, to interface with one or more user devices 86, e.g., a consumer's mobile phone, which may include one or more processors 88, a memory 90 and a user interface 92) to enable a customer to control drip coffee maker 10 through the user device 86. It may also be desirable to interface with one or more remote services 94, e.g., to obtain firmware updates, to access remote databases with recipes, coffee bean information, to persist user preferences, to provide maintenance or diagnostic functionality, etc. Moreover, in some embodiments, at least a portion of controller 60 may be implemented externally, e.g., within a mobile device, a cloud computing environment, etc., such that at least a portion of the functionality described herein is implemented within the portion of the controller that is externally implemented.

In some embodiments, controller 60 may operate under the control of an operating system and may execute or otherwise rely upon various computer software applications, components, programs, objects, modules, data structures, etc. In addition, controller 60 may also incorporate hardware logic to implement some or all of the functionality disclosed herein. Further, in some embodiments, the operational sequences performed by controller 60 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

It will be appreciated that drip coffee maker 10 may be configured in a wide variety of other manners and may omit one or more of the components discussed above and/or may incorporate other components not explicitly discussed above. For example, as illustrated in FIG. 2, it may be desirable in some embodiments to utilize a bar code or other scanner 96 to enable coffee bean or ground coffee bar codes to be scanned to identify a particular coffee bean or ground coffee being used for a coffee brewing operation and thereby enable the coffee brewing operation to be specifically tailored for a particular coffee bean or ground coffee. Such functionality could also be supported in user device 86, e.g., using a camera of the user device to capture an image of a bar code.

As noted above, in some embodiments, it may be desirable to utilize one or more electronically-controlled variable valves to effectively regulate a water/coffee contact time during a drip coffee brewing operation, as a coffee flavor profile can be significantly impacted by the contact time of the coffee grounds with the heated water used for brewing, as well as the uniformity of the extraction of solubles from the coffee grounds throughout the volume of a brew basket. It has been found that it is difficult to achieve optimal brewing conditions in a brew basket over a large range of serving sizes, grind sizes, and bean roasts, as the geometry, hydraulic resistance, and rate of extraction all generally vary over the range of user determined parameters.

An electronically-controlled variable valve, however, that is moveable between a continuous range of positions, may be used in some embodiments to controllably vary the flow rate into and/or out of a brew basket to minimize the influence of these various parameter changes. It will be appreciated, however, that in other embodiments, no electronically-controlled variable valves may be used, so the invention is not limited to drip coffee makers incorporating electronically-controlled variable valves.

Figure 3:
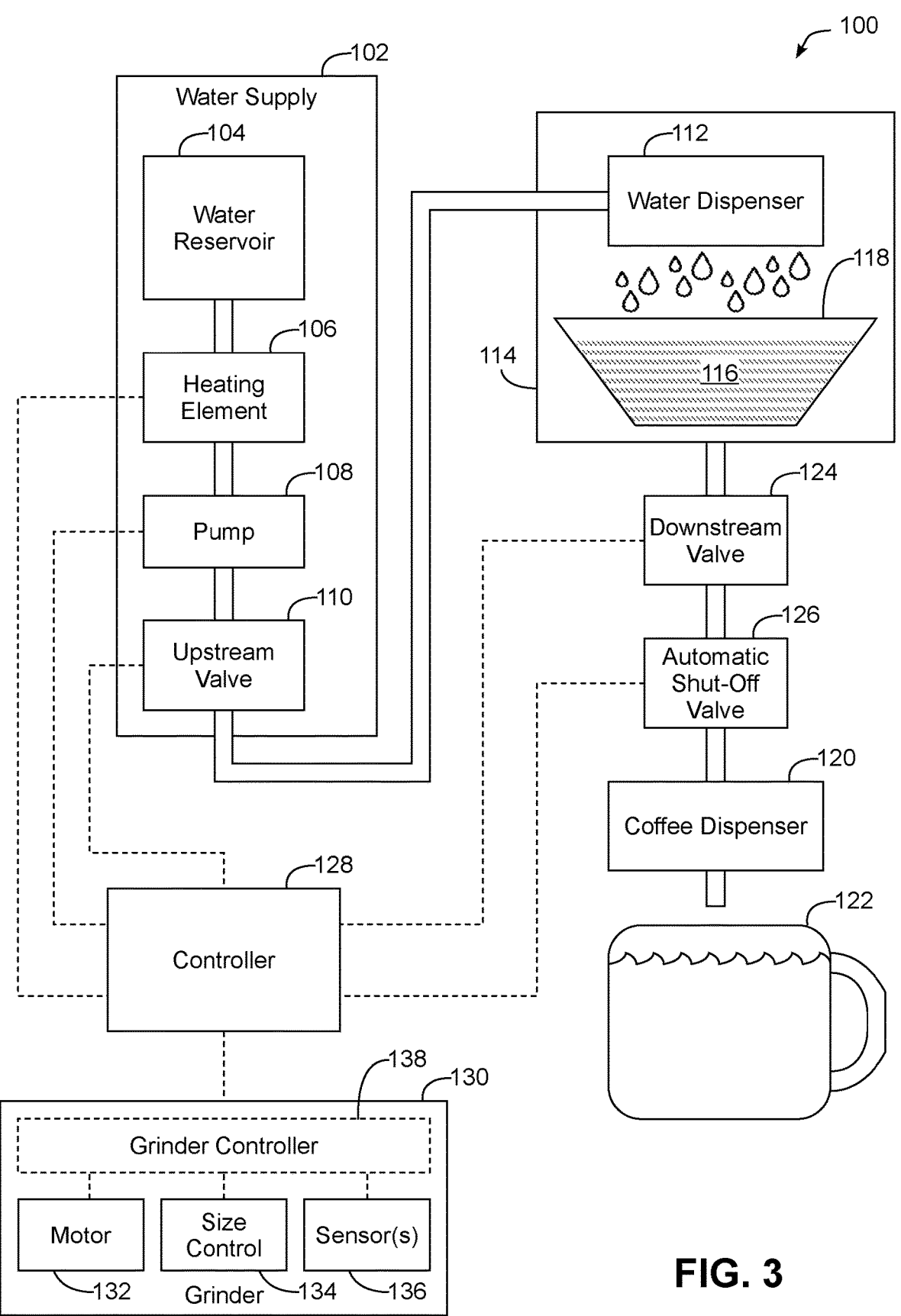
FIG. 3 is a block diagram of various brewing components in a drip coffee maker consistent with some embodiments of the invention.

FIG. 3 illustrates the functional components of a drip coffee maker 100 that includes one or more electronically-controlled variable valves consistent with the invention. Heated water for use in brewing is generated by a water supply 102, which may include a water reservoir 104 (or alternatively, a water line coupled to a water service) that feeds water to a heating element 106 to be heated to a desired temperature. In some embodiments, the temperature may be variable and optimized for a particular drip coffee brewing operation, while in other embodiments, a fixed temperature may be used. Various types of heating elements may be used, including a resistive heating element disposed in a water tank or adjacent a water line. A pump 108 may be used in some embodiments to drive the flow of heated water, while in other embodiments, the heated water may be driven without the use of a pump, e.g., as a result of pressure generated during the heating process.

Water supply may also include an upstream valve 110 that controls the rate of water flow to a water dispenser 112 disposed in a brew basket 114. In other embodiments, however, one or both of pump 108 and upstream valve 110 may be omitted.

Disposed within brew basket 114 during a drip coffee brewing operation may be a quantity of coffee grounds 116 disposed within a disposable or reusable filter 118. Heated water from water supply 102 is dispensed by water dispenser 112 onto the top surface of the coffee grounds 116 to bring the heated water into contact with the coffee grounds to extract solubles from the coffee grounds and thereby brew coffee. Water dispenser 112 may include a shower head or other collection of apertures suitable for distributing water over much of the surface of the coffee grounds, as it is generally desirable to evenly distribute water through the coffee grounds in order to uniformly extract solubles from the coffee grounds.

The coffee may pass through filter 118 and out of brew basket 114 to a coffee dispenser 120, which outputs the brewed coffee to a container 122, e.g., a carafe, cup or mug. In some embodiments, the rate of flow of coffee may be controlled by a downstream valve 124, and in some embodiments, an automatic shut-off valve 126 may be used to shut off coffee flow when no container 122 is positioned below the coffee dispenser 120.

A controller 128 may be used to control one or more of the aforementioned components, e.g., heating element 106, pump 108, upstream valve 110, downstream valve 124 and automatic shut-off valve 126. In the alternative, one or more of these components may be mechanical in nature, and not electronically-controllable. An upstream valve 110 or downstream valve 124 may be manually controllable in some embodiments, and in some embodiments automatic shut-off valve 126 may be mechanically actuated based upon the presence or absence of container 122. Downstream valve 124 and automatic shut-off valve 126 may also be combined in some embodiments, and one or both may be omitted in some embodiments. For example, where downstream valve

124 is electronically-controllable, a pause control operated by a user or a presence detector may be used to trigger a full shut off of downstream valve 124 in some embodiments. In addition, it will be appreciated that coffee dispenser 120 in some embodiments may be integrated into any of brew basket 114, downstream valve 124, and automatic shut-off valve, e.g., implemented as an opening or aperture in one of these components through which coffee may flow.

As noted above, one or both of upstream valve 110 and downstream valve 124 may be implemented using an electronically-controllable variable valve that is capable of being moved within a continuous range of positions to control a flow rate of fluid (e.g., water and/or coffee) through the valve. By controlling one or both of the rate of water entering the brew basket and the rate of coffee exiting the brew basket, the water/coffee contact time may be more precisely controlled, and may be adapted to accommodate different brewing parameters and thereby optimize a drip coffee brewing operation for different scenarios, e.g., different amounts of coffee grounds, different amounts of water, different water temperatures, different grind sizes, different types (e.g., roast levels, brands, models, producers, varieties, etc.) of coffee beans, as well as different user preferences, e.g., to brew stronger or weaker coffee and/or to increase or decrease the extraction or development of the drip coffee brewing operation to emphasize different flavor attributes.

Various valve designs that provide for a continuous range of flow rates may be used in various embodiments, including various types of ball valves, pinch valves, needle valves, etc. Generally, such valves include a valve member that is moveable within a range of positions to variably occlude a port or passageway and thereby vary a flow rate through the port or passageway. In addition, various manners of driving such valves for electronic control may be used, e.g., using servo, stepper, or other types of motors, linear actuators, lead screw drives, or electromagnetic drives capable of relatively accurate positioning.

As is also illustrated in FIG. 3, controller 128 may also be interfaced with a grinder 130, which in some instances may be integrated with drip coffee maker 100, such that controller 128 is configured to directly control one or both of a motor 132 and a size control 134, as well as receive feedback from one or more sensors 136, e.g., a weight sensor, a color sensor, etc., which may be used to characterize the roast level of the coffee being ground, as will be discussed in greater detail below. In other instances, grinder 130 may be separate from drip coffee maker 100, and may incorporate a separate controller 138 that is in communication with controller 128, e.g., through a wired or wireless network.

Numerous additional variations and modifications to the drip coffee maker illustrated in FIGS. 1-3 will be apparent to one of ordinary skill in the art, as will become apparent from the description below. Moreover, while the discussion hereinafter focuses on a drip coffee maker implementation, it will be appreciated that at least some of the features disclosed herein may also be used in connection with other types of coffee makers, e.g., espresso machines, where heated water is introduced under high pressure to the brew basket (often referred to as a portafilter). Therefore, the invention is not limited to the specific implementations discussed herein.

Coffee Roast Level Characterization

A wide variety of parameters can affect the flavor profile of drip brewed coffee. Among these parameters are strength, which represents the concentration of solubles in the coffee, and extraction or development, which represents the yield of solubles in the coffee. Strength may be defined in terms of total dissolved solids (TDS), e.g., the percentage (alternatively, the amount) of the end product that includes dissolved solids extracted from the coffee grounds during the brewing process. Extraction or development, e.g., as defined in terms of extraction yield (EY), may be defined in terms of the percentage of the coffee grounds that have been extracted, and thus have moved into the liquid phase. Relating both strength and extraction is brewing ratio, which represents the ratio of the ground coffee and water used as inputs to the drip coffee brewing process.

The aforementioned parameters can have significant impact on the taste of brewed coffee. Strength, for example, generally varies between strong and weak, while extraction or development generally varies between under-developed, which tends to produce sour or grassy flavors, and bitter, and in many instances, it is desirable to produce a balance both between both strong and weak and between under-developed and bitter. Reliably and reproducibly controlling a drip coffee brewing operation to achieve a desired coffee flavor profile, however, can be difficult to achieve, particularly when other parameters, particularly the characteristics of the coffee beans used in the operation, can also impact a coffee flavor profile.

It has been found, in particular, that coffee extraction is highly dependent on the roast level of the beans used. In comparison to lightly roasted beans, dark roast beans are generally easier to extract, principally because the cell walls of the beans are more broken down and more porous than those of lightly roasted beans. To achieve particular TDS and EY values in a drip coffee brewing operation, it may be desirable to account for the coffee roast level.

As such, in some embodiments of the invention, coffee roast level characterization is performed to characterize the roast level of the coffee beans (whether in unground or ground form) prior to brewing such that the coffee roast level may be accommodated in the calculation of appropriate brewing parameters for a drip coffee brewing operation, e.g., to apply a roast level coefficient that is calculated based on the determined roast level to modify one or more brewing control transfer functions utilized to control a drip coffee brewing operation. This may allow, for example, brewing parameters associated with an optimum coffee flavor profile, e.g., a "golden cup" coffee flavor profile, to be adjusted to accommodate for various types of coffee roast levels in some embodiments. As one example, the Specialty Coffee Association (SCA) defines a golden cup coffee profile as having a TDS between about 1.15% and about 1.35%, and an EY of between about 18% and about 22%. In addition or alternatively, this may allow brewing parameters to be calculated to achieve a consumer's desired coffee flavor profile that may differ from an optimum coffee flavor profile, e.g., if a consumer desires a stronger or weaker cup of coffee, or if a consumer prefers greater or less bitterness or other types of flavor attributes that tend to be emphasized with different combinations of strength and extraction. In addition, in some embodiments, coffee roast level characterization may allow a desired coffee flavor profile to be achieved with greater precision and repeatability. In some embodiments, for example, coffee roast level may be used to determine a water/coffee contact time for a drip coffee brewing operation.

It will be appreciated, however, that coffee roast level may be utilized in combination with a multitude of other brewing parameters that also affect a coffee flavor profile. It has been found, for example, that the water temperature, the brewing ratio (e.g., the ratio of the weight or volume of the ground coffee and the weight or volume of the water), and the water/coffee contact time can have a significant impact on the coffee flavor profile. Moreover, the grind size of the coffee beans can also affect the coffee flavor profile as finer grinding generally exposes a greater overall surface area to the water, and thus increases extraction rate. In some drip coffee brewing operations, "blooming" may also be performed, where the ground coffee is wetted down at the start of the operation to allow carbon dioxide to be released from the ground coffee in the form of bubbles, rather than being absorbed into the coffee.

It will be appreciated that some of the aforementioned brewing parameters may be directly controllable (e.g., water temperature, grind size), while others may be indirectly controllable (e.g., brewing ratio and water/coffee contact time, and in some instances blooming time). Brewing ratio may be controlled, for example, by controlling the volume or mass of coffee grounds and water used in the operation, while water/coffee contact time and blooming time may be controlled by controlling the rate of water flow into a brew basket, controlling the rate of water flow out of the brew basket, or both.

Additional brewing parameters that may impact a coffee flavor profile, either directly or indirectly, may include, for example, coffee bean type (e.g., brand, model, variety), water pressure, flow rate, and valve position (where a variable valve provides a varying flow rate). The aforementioned list, however, is not exhaustive, and thus other brewing parameters that at least indirectly affect a coffee flavor profile may be used in other embodiments, as will be appreciated by those of ordinary skill having the benefit of the instant disclosure.

Coffee roast level characterization may be implemented in a number of different manners in different embodiments. For example, in some embodiments, coffee roast level characterization may be based at least in part on the density of the coffee beans used in a drip coffee brewing operation, as roasting has been found to progressively decrease the density of a coffee bean, i.e., generally the ratio between weight and volume. Roasting releases moisture from coffee beans, so the longer beans are roasted, the more moisture is removed, and the lower the density of the beans. In addition, during roasting, carbon dioxide is released and bean size increases.

One manner in which density, and thus roast level, of coffee may be characterized may rely on the fact that burr style coffee grinders generally process coffee beans at a substantially constant volumetric rate (e.g., in terms of beans/second) for a given grind size setting. As such, with a burr grinder, the volume of coffee output by a grinding operation may be considered to be substantially proportional to the duration of the grinding operation. Thus, by determining the rate at which the weight or mass of the grounds generated by a grinding operation changes over time, an approximation of density, and thus roast level, may be obtained.

In some embodiments, for example, a controller may utilize a weight sensor to characterize a roast level of coffee grounds generated by the coffee mechanism and sensed by the weight sensor. For example, a weight sensor may be used to measure the weight of the grounds generated by a burr grinding mechanism at one or more points in a grinding operation, and the time at which each measurement is taken may be used to calculate the rate at which the coffee is ground (e.g., in terms of rate of weight change, such as in grams/second). As noted above, since grind rate varies with grind size, empirical testing may be used to match different roast levels to different combinations of rate and grind size. While various manners of measuring weight and/or time may be used in different embodiments, in the embodiment discussed hereinafter, an inbuilt scale in a coffee grinder may be used to measure weight, and a control circuit may be used to record one or more measured weights with associated timestamps to calculate a rate at which the weight changes during grinding. Combining this rate with the grind size setting may thereby enable a density, and thus a roast level, to be characterized for the coffee used in the drip coffee brewing operation.

It will be appreciated that, while in some embodiments density and/or coffee roast level may be directly determined and/or may be used in the generation of one or more brewing parameters (e.g., via a transfer function), in other embodiments one or more brewing parameters may be determined based at least in part on density and/or coffee roast level without any direct calculations or determinations thereof. For example, in some embodiments a direct mapping may be made between, on one hand, a grind size and a rate of weight change in the coffee grounds during grinding (e.g., in terms of grams/second) and, on the other hand, one or more brewing parameters, such that no intermediate density and/or or coffee roast level is directly determined.

Figures 4, 5:
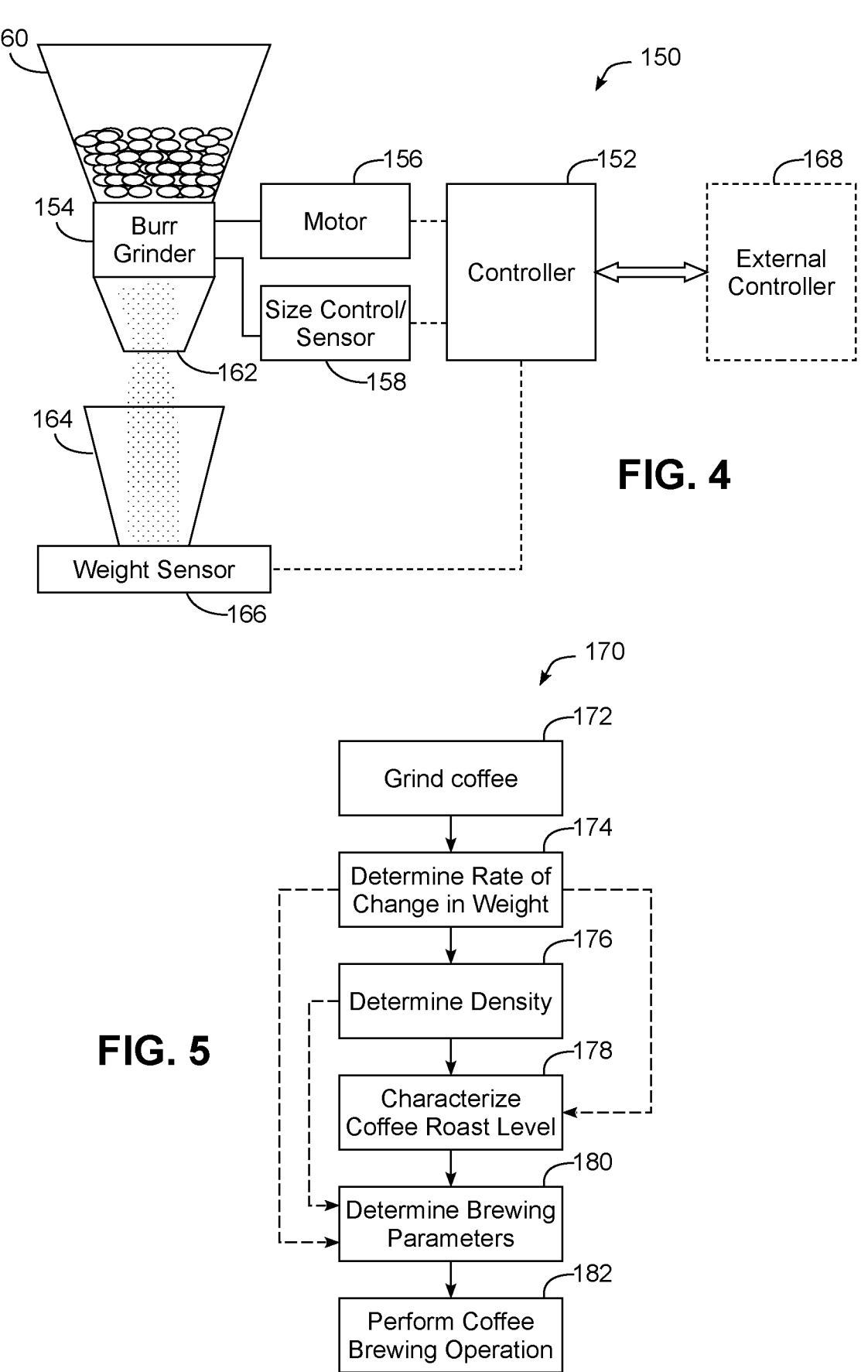
FIG. 4 is a block diagram of various grinding components that may be used to characterize coffee roast level consistent with some embodiments of the invention, and utilizing density to characterize coffee roast level.
FIG. 5 is flowchart illustrating an operational sequence suitable for assessing coffee roast level and controlling a coffee brewing operation based upon such assessment utilizing the grinding components illustrated in FIG. 4.

FIG. 4, for example, illustrates various components of an example coffee grinder 150 suitable for implementing density-based coffee roast level characterization consistent with the invention. A controller 152, for example, may control a coffee grinding mechanism 154, e.g., a burr grinder, by driving a motor 156, and in some instances, by controlling an electromechanical size control 158, to control both grind duration and grind size during a grinding operation. In some embodiments, manual grind size control may be used, and a consumer may be instructed to set the grind size to a suitable setting for a particular coffee brewing operation, while in some embodiments, a sensor may be used to sense the manual grind size selected by a user, with the sensed grind size used as an input for controlling a coffee brewing operation.

Coffee beans are stored in a bin or hopper 160 positioned over burr grinding mechanism 154 that outputs ground coffee from a chute 162 into a container 164. A weight sensor 166 (e.g., a scale, one or more load cells, or any other suitable device for sensing weight) supports container 164 to measure the weight of the coffee dispensed through chute 162. In some embodiments, e.g., where coffee grinder 150 is independent of a drip coffee maker, controller 152 may be in communication with an external controller 168, e.g., of a drip coffee maker, a user's mobile device, a cloud service, etc., e.g., over a wireless or wired connection. In other embodiments, e.g., where grinder 150 is integrated into a drip coffee maker, controller 152 may represent the main controller of the drip coffee maker.

FIG. 5, for example, illustrates an operational sequence 170 capable of being performed by controller 152 and/or controller 168 in various embodiments. In block 172, coffee is ground to generate ground coffee, e.g., by controlling motor 156, and in some instances, size control 158, to generate coffee grounds. In block 174, a rate of weight change of the generated coffee grounds is determined, and in block 176, a density of the generated coffee grounds is determined. Coffee roast level is then characterized in block 178, and based at least in part upon the characterized coffee roast level, one or more brewing parameters are determined in block 180. A coffee brewing operation, e.g., a drip coffee brewing operation, is then performed in block 182 using the determined brewing parameters, such that the coffee brewing operation is performed using the characterized coffee roast level of the coffee grounds used in the coffee brewing operation.

Figure 6:
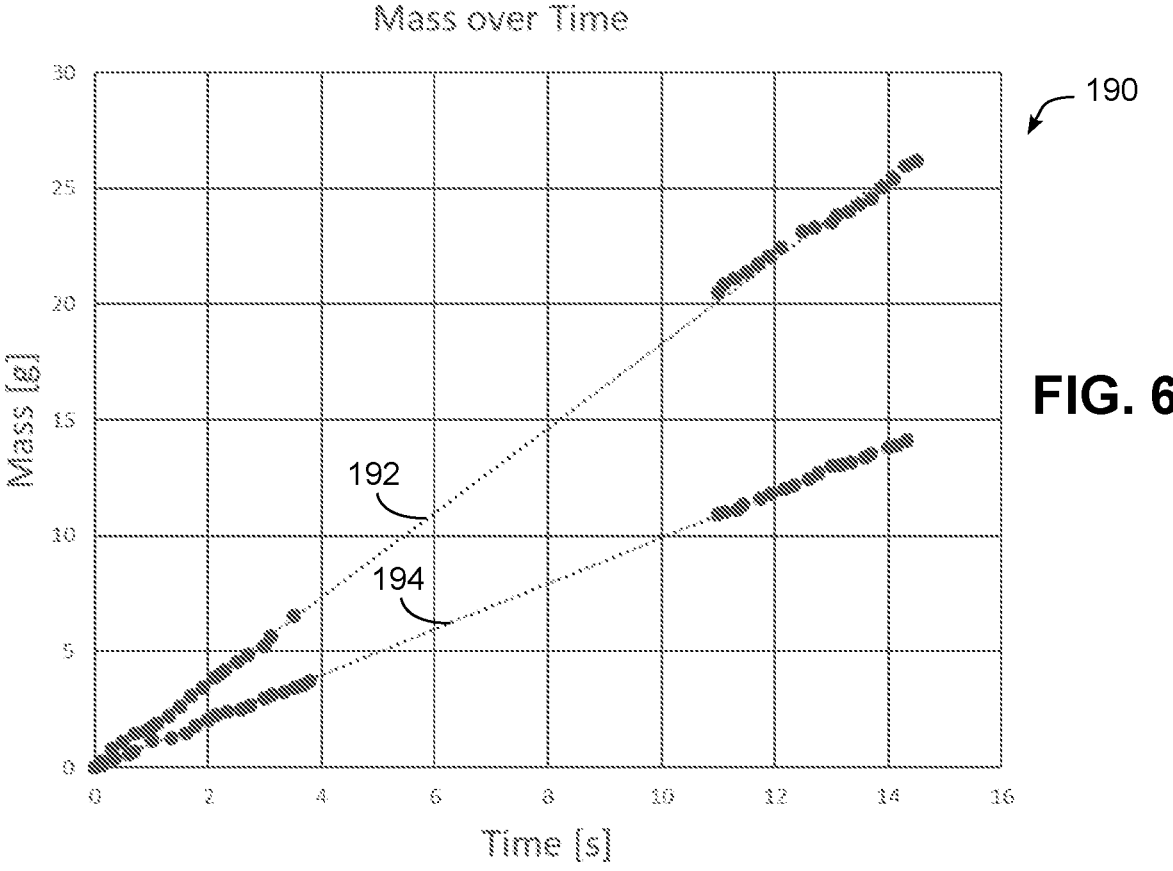
FIG. 6 is a graph of mass (weight) over time when grinding light and dark roast coffee beans.

Returning to block 174, as noted above, the rate of weight change of the coffee grounds may be based upon one or more weights sensed during a grinding operation. The sensed weights may be associated with particular times during which the weights were sensed, such that a rate in which the weight changes may be determined. FIG. 6, for example, is a graph 190 of mass over time captured when grinding two different types of coffee beans using the same coffee grinder set to the same grind size. Line 192 is fit to a plurality of weight measurements captured during grinding of light roast Columbian coffee beans, while line 194 is fit to a plurality of weight measurements captured during grinding of dark roast Italian coffee beans, and it may be seen that the slopes of lines 192, 194, which represent the rate of weight change during grinding, are distinguishable from one another, such that the slopes are indicative of different roast levels. Similar differences exist at different grind sizes for a given coffee grinding mechanism, so through empirical testing, mappings may be generated between slope (rate of weight change) and coffee roast level for different grind sizes, thereby enabling a coffee roast level to be characterized from a determined rate of weight change and grind size.

Various manners of calculating the slope, or rate of weight change, during grinding, may be used in different embodiments. A rate of weight change in some embodiments may be calculated as a ratio of a difference between first and second weights and a difference between first and second times at which the first and second weights are captured. In some embodiments, it may be sufficient to simply capture a single weight reading at a predetermined time during grinding, or at the completion of grinding, and determine the rate of weight change using the starting point, where weight=0 and time=0, as one of the data points used to calculate the rate of weight change. In other embodiments, it may be desirable to capture multiple data points at various times during a grinding operation, e.g., at fixed or variable intervals, and generate timestamps associated with each sensed weight such that one or more rates of weight changes can be determined from the various timestamps, and averaged together if desired. In other embodiments, curve fitting or regression may be used on multiple timestamps to derive a rate of weight change. Other manners of determining a rate of weight change may be used in other embodiments, as will be appreciated by those of ordinary skill having the benefit of the instant disclosure.

Returning to block 176, in some embodiments, a rate of weight change may be used to generate a density using the known grind size and a mapping of grind sizes to known volumetric rates of grinding, e.g., based upon empirical testing of the coffee grinding mechanism. Assuming, for example, that for a given grind size s the volumetric rate of change for the coffee grinding mechanism is a constant $R_{v,s}$, the density (D) is related to the rate of weight change ($R_w$) as follows:

$$D(g/mm^3)=R_w(g/s)/R_{v,s}(mm^3/s) \qquad (1)$$

In addition, in block 178, the determined density may be mapped to a coffee roast level, e.g., by mapping ranges of density to relatively broad roast categories (e.g., dark, medium-dark, medium, medium-light, light), or mapping density values to more granular numerical roast levels (e.g., 0-10), among other variations.

Further, as represented by the dashed lines in FIG. 5 between blocks 174 and 176 to block 180, it is not necessary in some embodiments to determine each of a rate of weight change, a density, and a coffee roast level in order to determine one or more brewing parameters based on a characterized coffee roast level, as, for example, a coffee roast level may be characterized without directly determining a density in some embodiments, while in some embodiments, a brewing parameter may be determined using any of a directly determined rate of weight change or a directly determined density.

It will also be appreciated that in some embodiments, a characterized coffee roast level, or alternatively, any of a number of factors that are indicative of a coffee roast level, may also be used to control a coffee grinding operation. For example, it may be desirable in some embodiments to control an amount of ground coffee used in a coffee brewing operation based upon a characterized coffee roast level. In some embodiments, an initial determination of the amount of ground coffee to be ground may be deferred until the coffee roast level has been characterized, while in other embodiments, a first, predetermined amount of ground coffee to be ground may be determined prior to grinding, and then selectively adjusted to a second, predetermined amount based at least in part on the characterized coffee roast level determined during grinding. The amount of coffee to be ground may be based in some embodiments on weight, while in other embodiments, the amount of coffee to be ground may be based on duration, given that some coffee grinding mechanisms such as burr grinding mechanisms generally produce ground coffee at a substantially constant rate of volumetric change, as noted above.

Therefore, in some embodiments, and during the grinding operation, a coffee roast level of the coffee grounds generated by a coffee grinding mechanism may be characterized prior to completing the grinding operation, and may be used to determine an amount of coffee grounds to be ground by the coffee grinding mechanism during the grinding operation based at least in part on the characterized coffee roast level of the coffee grounds generated by the coffee grinding mechanism.

Figure 7:
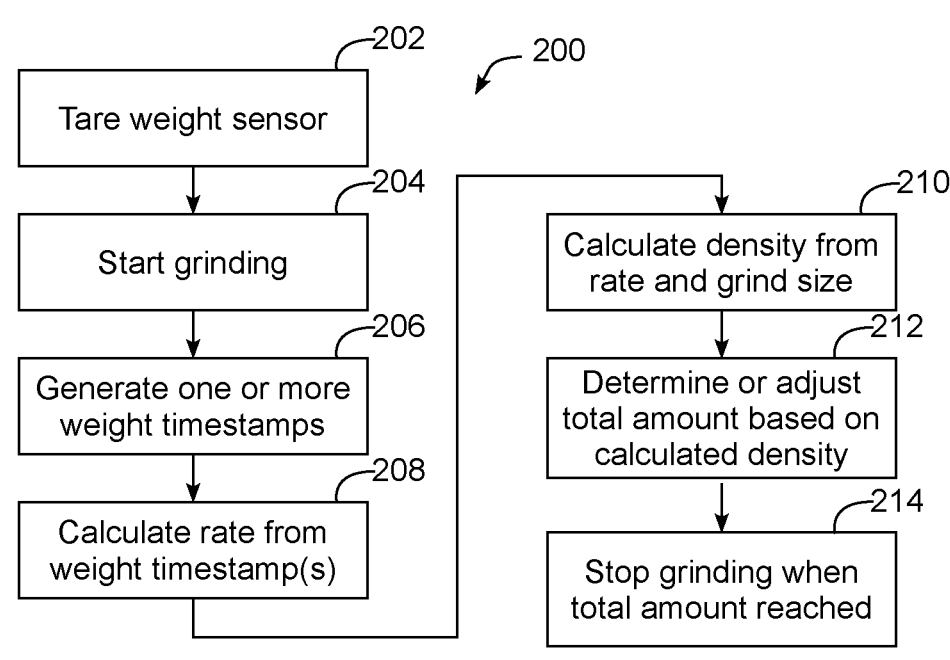
FIG. 7 is a flowchart illustrating an operational sequence suitable for grinding coffee and assessing coffee roast level utilizing the grinding components illustrated in FIG. 4.

FIG. 7, for example, illustrates an operational sequence 200 for performing a grinding operation, e.g., using a coffee grinder such as coffee grinder 150 of FIG. 4. Initially, in block 202, the weight sensor is tared, e.g., to compensate for the weight of any container (e.g., container 164) supported by the weight sensor (e.g., weight sensor 166). Then, in block 204, grinding is initiated. In some embodiments, a grind size may also be set prior to grinding, e.g., automatically using a grind size control, or manually by a user (e.g., as instructed by a user interface), and as noted above, in some embodiments, an initial predetermined amount of coffee grounds to be generated may also be determined.

Next, during grinding, one or more weight timestamps are generated in block 206, and in block 208, a rate of weight change is calculated. Next, in block 210, a density is calculated from the determined rate of weight change and the grind size used for grinding. Then, in block 212, the total amount (e.g., a total weight or total time or duration) may be selectively adjusted based on the calculated density. Block 214 then continues grinding until the total amount (e.g., a total weight sensed by the weight sensor or a total time or duration) has been ground, at which point the grinding operation is complete.

It will be appreciated that, in operational sequence 200, other manners of characterizing coffee roast level may be used in order to determine the total amount of ground coffee to be generated in the grinding operation. For example, a single weight reading, captured at the end of grinding or at an intermediate point during grinding, may be determined in some embodiments, and in some embodiments, no intermediate density and/or coffee roast level may be determined.

Figures 8, 9:
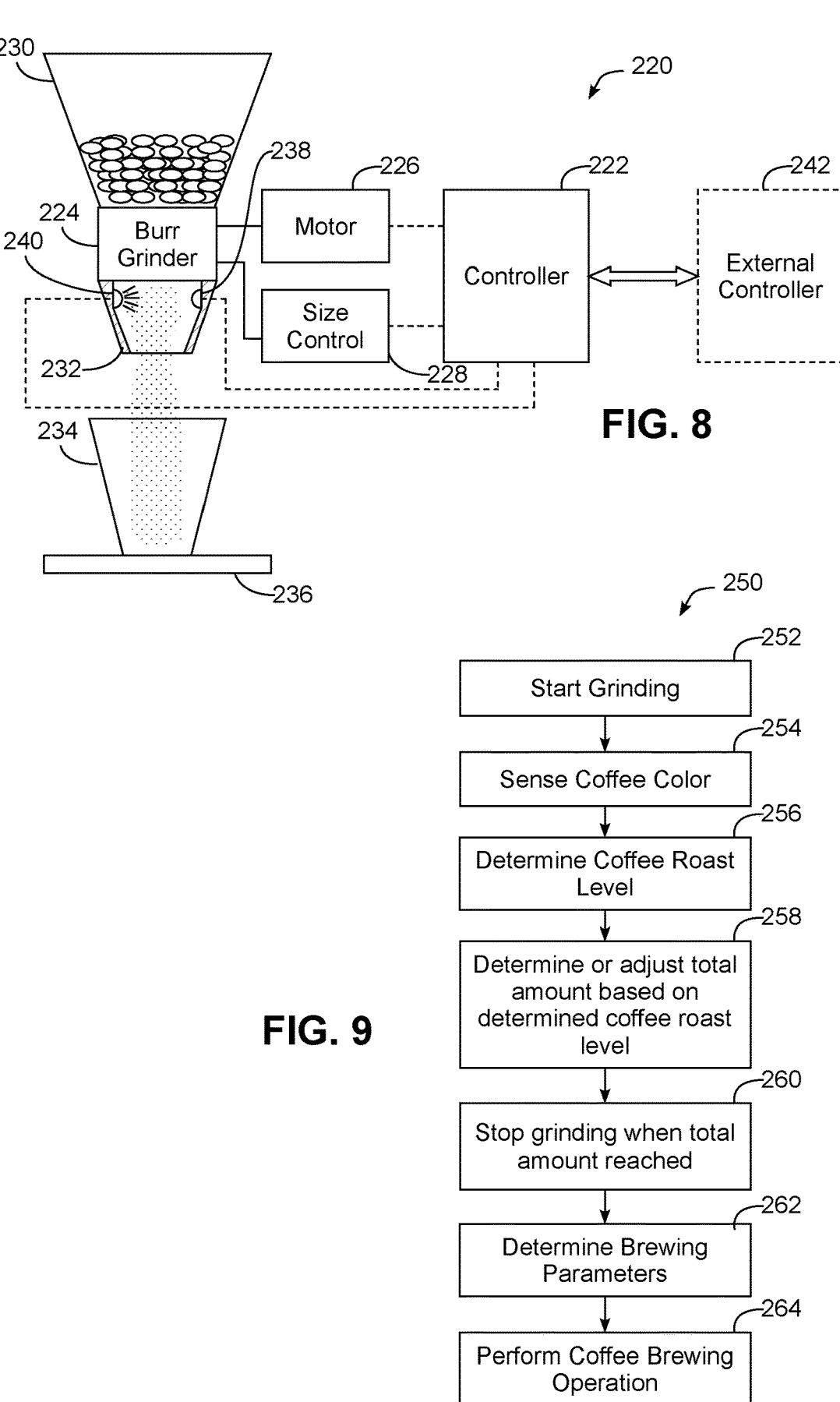
FIG. 8 is a block diagram of various grinding components that may be used to characterize coffee roast level consistent with some embodiments of the invention, and utilizing color to characterize coffee roast level.
FIG. 9 is flowchart illustrating an operational sequence suitable for assessing coffee roast level and controlling a coffee brewing operation based upon such assessment utilizing the grinding components illustrated in FIG. 8.

Furthermore, in some embodiments, other manners of characterizing coffee roast level, which are not based on weight or density, may be used. For example, FIGS. 8-9 illustrate another embodiment in which coffee roast level is characterized based upon the output of a color sensor positioned to sense the color of ground coffee generated by a coffee grinder. FIG. 8, in particular, illustrates various components of an example coffee grinder 220 suitable for implementing color-based coffee roast level characterization consistent with the invention. A controller 222, for example, may control a coffee grinding mechanism 224, e.g., a burr grinder, by driving a motor 226, and in some instances, by controlling an electromechanical size control 228, to control both grind duration and grind size during a grinding operation. In some embodiments, manual grind size control may be used, and a consumer may be instructed to set the grind size to a suitable setting for a particular coffee brewing operation, while in some embodiments, a sensor may be used to sense the manual grind size selected by a user, with the sensed grind size used as an input for controlling a coffee brewing operation.

Coffee beans are stored in a bin or hopper 230 positioned over burr grinding mechanism 224 that outputs ground coffee from a chute 232 into a container 234. Rather than a weight sensor, a portion of a housing, e.g., a platform 236, may be used to support container 234. In addition, a color sensor 238, e.g., an RGB sensor that captures color and luminosity, may be positioned to sense a color of the coffee grounds generated by coffee grinding mechanism 224. In one embodiment, color sensor 238 may be positioned within chute 232, which in some embodiments may be opaque to minimize the effects of ambient light, and in some embodiments, an illumination source, e.g., an LED 240, may also be positioned within chute 232 to illuminate the coffee grounds for sensing by color sensor 238. In some embodiments, e.g., where coffee grinder 220 is independent of a drip coffee maker, controller 222 may be in communication with an external controller 242, e.g., of a drip coffee maker, a user's mobile device, a cloud service, etc., e.g., over a wireless or wired connection. In other embodiments, e.g., where grinder 220 is integrated into a drip coffee maker, controller 222 may represent the main controller of the drip coffee maker.

FIG. 9 illustrates an operational sequence 250 capable of being performed at least in part by coffee grinder 220. Grinding may be initiated in block 252, and during grinding, a color of the coffee grounds may be sensed in block 254, and a coffee roast level may then be determined based upon the determined color in block 256. Then, based on the determined coffee roast level, the amount of coffee to grind (e.g., a desired weight, if a weight sensor is provided, or a desired time or duration) may be determined or adjusted (if a predetermined amount was determined prior to grinding) in block 258, and grinding may continue until the desired amount has been ground (block 260).

In addition, as illustrated in blocks 262-264, the coffee roast level determined in block 256 may also be used to determine one or more brewing parameters in a similar manner to that discussed above (block 262) such that when a coffee brewing operation is commenced (block 264), the determined brewing parameter(s) are used in the coffee brewing operation.

Other sensors capable of sensing the visual or spectral appearance of coffee grounds, or of coffee beans prior to grinding, may be used in other embodiments, e.g., other image sensors, infrared sensors, spectrometers, etc. In addition, in embodiments where a sensor may be subjected to ambient light, a calibration operation may be performed, e.g., upon initial setup or prior to each grinding operation, to correct for variations in ambient light.

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. An apparatus, comprising:
   a coffee grinding mechanism configured to grind coffee beans to generate ground coffee;
   a weight sensor configured to sense a weight of coffee grounds generated by the coffee grinding mechanism during a grinding operation; and
   a controller configured to characterize a roast level of the coffee grounds generated by the coffee grinding mechanism based at least in part on the weight of the coffee grounds sensed by the weight sensor.

2. The apparatus of claim 1, wherein the controller is configured to characterize the roast level of the coffee grounds generated by the coffee grinding mechanism based at least in part on the weight of the coffee grounds sensed by the weight sensor by determining a density of the coffee grounds generated by the coffee grinding mechanism.

3. The apparatus of claim 1, wherein the controller is configured to characterize the roast level of the coffee grounds generated by the coffee grinding mechanism based at least in part on the weight of the coffee grounds sensed by the weight sensor by determining a rate of weight change of the coffee grounds generated by the coffee grinding mechanism.

4. The apparatus of claim 3, wherein the controller is configured to determine the rate of weight change by determining a first weight of the coffee grounds at a first time during the grinding operation.

5. The apparatus of claim 4, wherein the controller is configured to determine the rate of weight change further by determining a second weight of the coffee grounds at a second time during the grinding operation and determining a ratio of a difference between the first and second weights and a difference between the first and second times.

6. The apparatus of claim 3, wherein the controller is further configured to characterize the roast level of the coffee grounds generated by the coffee grinding mechanism based at least in part on a grind size used for the grinding operation.

7. The apparatus of claim 1, wherein the apparatus is a coffee grinder and the controller is a grinder controller, and wherein the grinder controller is configured to communicate data associated with the roast level of the coffee grounds to a coffee maker controller for use in controlling one or more brewing parameters of a coffee brewing operation performed by the coffee maker controller.

8. The apparatus of claim 7, wherein the data associated with the roast level of the coffee grounds includes a rate of weight change, a density or a coffee roast level.

9. The apparatus of claim 1, wherein the apparatus is a coffee maker controller.

10. The apparatus of claim 1, wherein the controller is further configured to:

initiate a grinding operation by the coffee grinding mechanism to grind coffee grounds;

during the grinding operation, characterize the coffee roast level of the coffee grounds generated by the coffee grinding mechanism;

prior to completing the grinding operation, determine an amount of coffee grounds to be ground by the coffee grinding mechanism during the grinding operation based at least in part on the characterized coffee roast level of the coffee grounds generated by the coffee grinding mechanism; and terminate the grinding operation once the determined amount of coffee grounds have been ground by the coffee grinding mechanism.

11. The apparatus of claim 10, wherein the controller is configured to initiate the grinding operation to grind a predetermined amount of coffee grounds, and to determine the amount of coffee grounds to be ground by adjusting the predetermined amount based at least in part on the characterized coffee roast level.

12. The apparatus of claim 1, wherein the controller is further configured to control one or more brewing parameters during a coffee brewing operation based at least in part on the characterized roast level of the coffee grounds generated by the coffee grinding mechanism.

13. The apparatus of claim 12, wherein the one or more brewing parameters includes a water temperature, a water pressure, a water flow rate, a valve position, a water amount, a coffee amount, a grind size, a brewing ratio, and/or a water/coffee contact time.

14. A coffee maker, comprising:

a brew basket configured to house coffee grounds during brewing;

a water supply disposed upstream of the brew basket and configured to supply heated water to the brew basket to bring the heated water into contact with the coffee grounds to perform a coffee brewing operation; and a controller coupled to the water supply and configured to control one or more brewing parameters during the coffee brewing operation based at least in part upon a density of the coffee grounds in the brew basket.

15. The coffee maker of claim 14, wherein the controller is configured to control the one or more brewing parameters based at least in part upon the density of the coffee grounds by receiving data associated with a roast level of the coffee grounds and controlling the one or more brewing parameters using the received data associated with the roast level of the coffee grounds.

16. The coffee maker of claim 15, wherein the data associated with the roast level of the coffee grounds includes a rate of weight change sensed by a weight sensor during grinding of the coffee grounds or a density.

17. An apparatus, comprising:

one or more memories; and one or more controllers configured to execute instructions stored in the one or more memories to control a coffee grinding mechanism to grind coffee beans and generate ground coffee therefrom by:

initiating a grinding operation by the coffee grinding mechanism to grind coffee grounds;

during the grinding operation, characterizing a coffee roast level of the coffee grounds generated by the coffee grinding mechanism;

prior to completing the grinding operation, determining an amount of coffee grounds to be ground by the coffee grinding mechanism during the grinding operation based at least in part on the characterized coffee roast level of the coffee grounds generated by the coffee grinding mechanism; and terminating the grinding operation once the determined amount of coffee grounds have been ground by the coffee grinding mechanism.

18. The apparatus of claim 17, wherein the one or more controllers are configured to characterize the coffee roast level by determining a weight of the coffee grounds at one or more times during the grinding operation, and to determine the amount of coffee grounds based at least in part on the weight determined at the one or more times during the grinding operation.

19. The apparatus of claim 17, wherein the one or more controllers are configured to characterize the coffee roast level based upon an output of a color sensor positioned to sense the coffee grounds generated by the coffee grinding mechanism during the grinding operation, and to determine the amount of coffee grounds based at least in part on the output of the color sensor during the grinding operation.

20. The apparatus of claim 17, wherein the one or more controllers are configured to determine the amount of coffee grounds by determining a duration of the coffee grinding operation or determining a total weight of coffee grounds to be generated during the grinding operation.

* * * * *